US011781616B2

(12) United States Patent
Borgerson et al.

(10) Patent No.: US 11,781,616 B2
(45) Date of Patent: Oct. 10, 2023

(54) VIBRATION ISOLATOR FOR AN APPLIANCE MOTOR HAVING INTERNAL SILENCING VOIDS

(71) Applicant: WHIRLPOOL CORPORATION, Benton Harbor, MI (US)

(72) Inventors: Matthew E. Borgerson, St. Joseph, MI (US); Eduardo Abraham Lopez, St. Joseph, MI (US); Pushpendra Prakash Mahajan, Pune (IN); Amit A. Nikam, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 235 days.

(21) Appl. No.: 17/118,635

(22) Filed: Dec. 11, 2020

(65) Prior Publication Data

US 2022/0186810 A1 Jun. 16, 2022

(51) Int. Cl.
| | |
|---|---|
| *F16F 15/126* | (2006.01) |
| *D06F 58/08* | (2006.01) |
| *D06F 37/20* | (2006.01) |
| *D06F 37/22* | (2006.01) |

(52) U.S. Cl.
CPC ............ *F16F 15/126* (2013.01); *D06F 58/08* (2013.01); *D06F 37/206* (2013.01); *D06F 37/22* (2013.01); *F16F 2224/025* (2013.01)

(58) Field of Classification Search
CPC ... F16F 15/126; F16F 2224/025; D06F 58/08; D06F 37/206; D06F 37/22
See application file for complete search history.

(56) References Cited

U.S. PATENT DOCUMENTS

| | | | |
|---|---|---|---|
| 6,436,283 B1 | 8/2002 | Duke | |
| 6,553,723 B1 | 4/2003 | Alcorn | |
| 7,025,076 B2 | 4/2006 | Zimmerman, Jr. et al. | |
| 7,779,855 B2 | 8/2010 | McAvoy et al. | |
| 8,097,151 B2 | 1/2012 | Allan | |
| 8,438,788 B2 | 5/2013 | Bell et al. | |
| 2005/0126230 A1* | 6/2005 | Choi | D06F 37/302 68/23.2 |
| 2008/0128030 A1 | 6/2008 | Lewis | |
| 2008/0175668 A1 | 7/2008 | Haese | |
| 2009/0242727 A1* | 10/2009 | Bruneau | D06F 37/206 34/108 |

(Continued)

FOREIGN PATENT DOCUMENTS

| | | |
|---|---|---|
| EP | 1541739 | 6/2005 |
| EP | 2518226 | 10/2012 |

(Continued)

*Primary Examiner* — Daniel D Yabut
(74) *Attorney, Agent, or Firm* — Price Heneveld LLP

(57) ABSTRACT

A laundry appliance includes a cabinet. A rotating drum is positioned within the cabinet. A blower directs process air through an airflow path. The airflow path includes the drum. A motor is coupled to the cabinet via a retaining bracket. The motor includes a drive shaft operably coupled to one of the drum and the blower. A damping ring is positioned about the drive shaft and between the motor and the retaining bracket. Damping apertures are defined within a body of the damping ring. The damping apertures define respective voids that absorb operational vibrations generated by the motor in an activated state.

17 Claims, 11 Drawing Sheets

(56) References Cited

U.S. PATENT DOCUMENTS

| | | |
|---|---|---|
| 2011/0017301 A1 | 1/2011 | Canavan |
| 2011/0050395 A1 | 3/2011 | Ervin |
| 2012/0318475 A1 | 12/2012 | Glover |
| 2014/0084726 A1* | 3/2014 | Burton .................. D06F 37/206 |
| | | 310/91 |
| 2014/0346099 A1 | 11/2014 | Brantley et al. |
| 2015/0082653 A1* | 3/2015 | Yu ........................... D06F 58/08 |
| | | 34/138 |
| 2017/0279334 A1 | 9/2017 | Nicoloff |

FOREIGN PATENT DOCUMENTS

| | | |
|---|---|---|
| EP | 2712064 | 3/2014 |
| GB | 2286849 | 8/1995 |
| GB | 2344132 | 5/2000 |
| GB | 2475924 | 6/2011 |

* cited by examiner

VIBRATION ISOLATOR FOR AN APPLIANCE MOTOR HAVING INTERNAL SILENCING VOIDS

BACKGROUND OF THE DISCLOSURE

The present disclosure generally relates to appliances, and more specifically, a vibration isolator for an appliance motor incorporating silencing voids for absorbing motor vibrations.

SUMMARY OF THE DISCLOSURE

According to one aspect of the present disclosure, a laundry appliance includes a cabinet. A rotating drum is positioned within the cabinet. A blower directs process air through an airflow path. The airflow path includes the drum. A motor is coupled to the cabinet via a retaining bracket. The motor includes a drive shaft operably coupled to one of the drum and the blower. A damping ring is positioned about the drive shaft and between the motor and the retaining bracket. Damping apertures are defined within a body of the damping ring. The damping apertures define respective voids that absorb operational vibrations generated by the motor in an activated state.

According to another aspect, a laundry appliance includes an interior structure. A motor is coupled to the appliance structure via a retaining bracket. The motor includes a drive shaft operably coupled to at least one rotational operating mechanism. An elastomeric damping ring is positioned about the drive shaft and between the motor and the retaining bracket. Damping apertures are defined within a body of the elastomeric damping ring that form voids that extend through an interior of the body. The voids absorb operational vibrations generated by the motor in an activated state.

According to yet another aspect of the present disclosure, a laundry appliance includes a cabinet. A rotating drum is positioned within the cabinet and having a rotating drum disposed therein. A blower directs process air through an airflow path. The airflow path includes the drum. A motor is coupled to the cabinet via a retaining bracket. The motor includes a drive shaft extending through opposing sides of the motor and operably coupled to the drum and the blower. Damping rings are positioned about the drive shaft and at the opposing sides of the motor. The damping rings are positioned between the motor and the retaining bracket. Damping voids extend through a body of the damping ring. The damping voids absorb operational vibrations generated by the motor in an activated state.

These and other features, advantages, and objects of the present disclosure will be further understood and appreciated by those skilled in the art by reference to the following specification, claims, and appended drawings.

Figure 1:
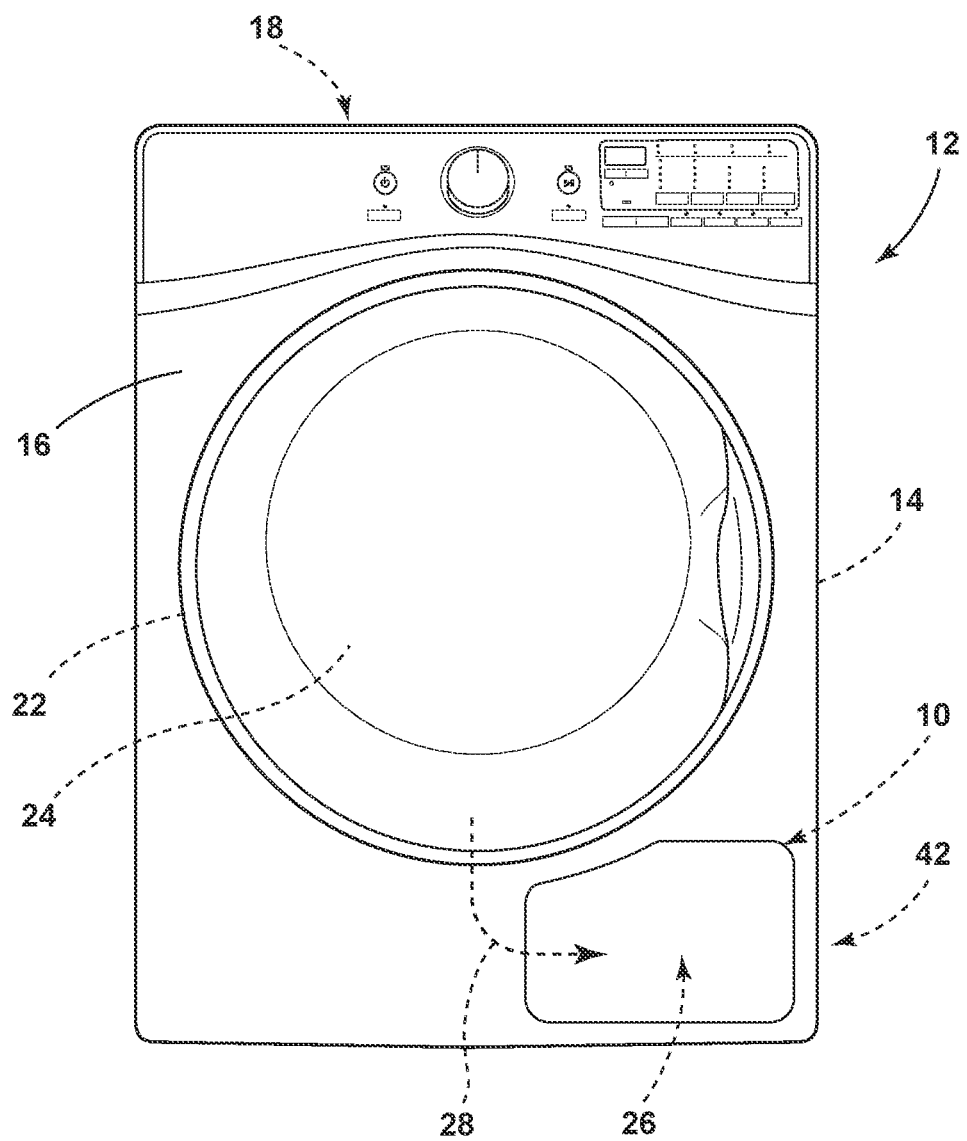
FIG. 1 is a front elevational view of a laundry appliance incorporating an aspect of the damping ring for absorbing motor vibrations.
Figure 2:
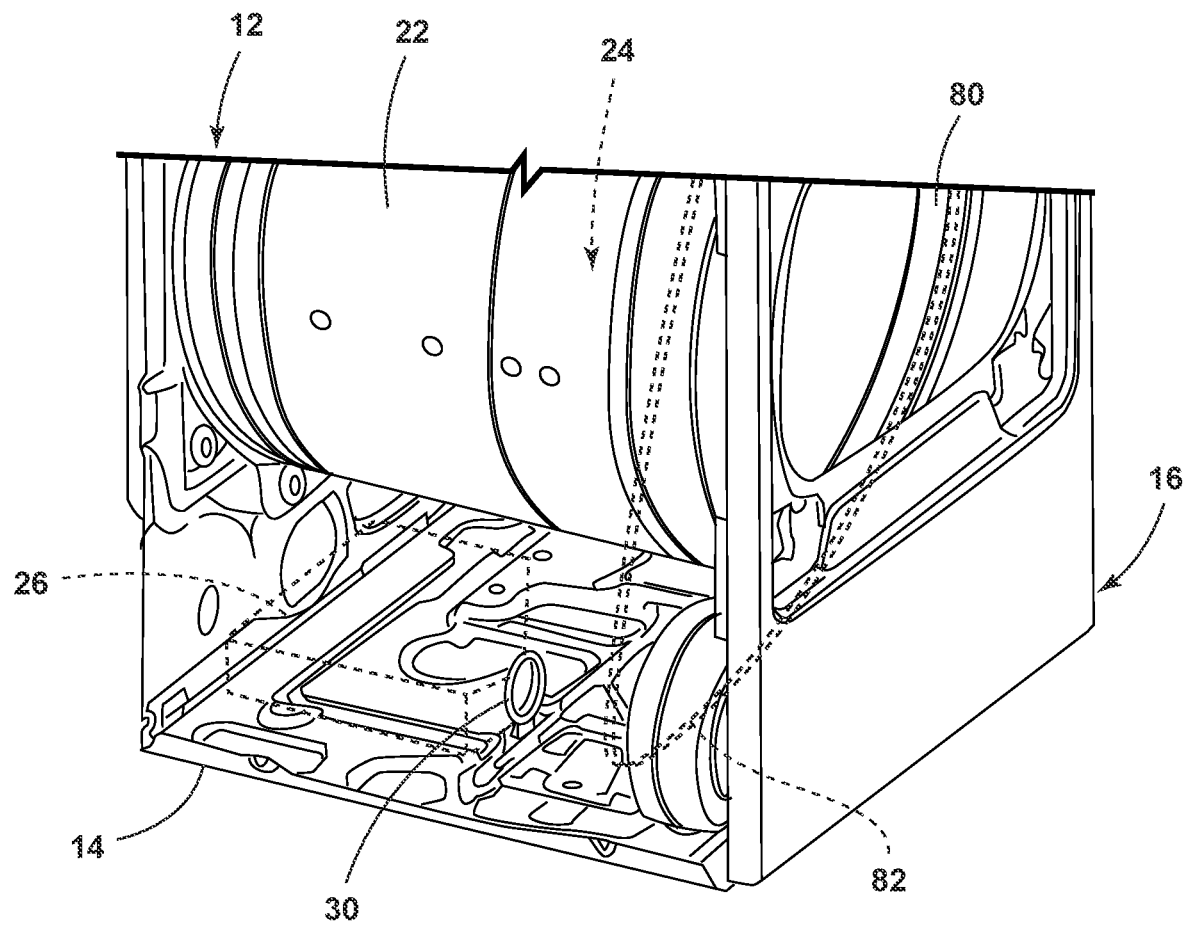
FIG. 2 is a side perspective view of a laundry appliance with various components removed to reveal an exemplary positioning of a retaining bracket for securing a motor to a laundry appliance.
Figure 3:
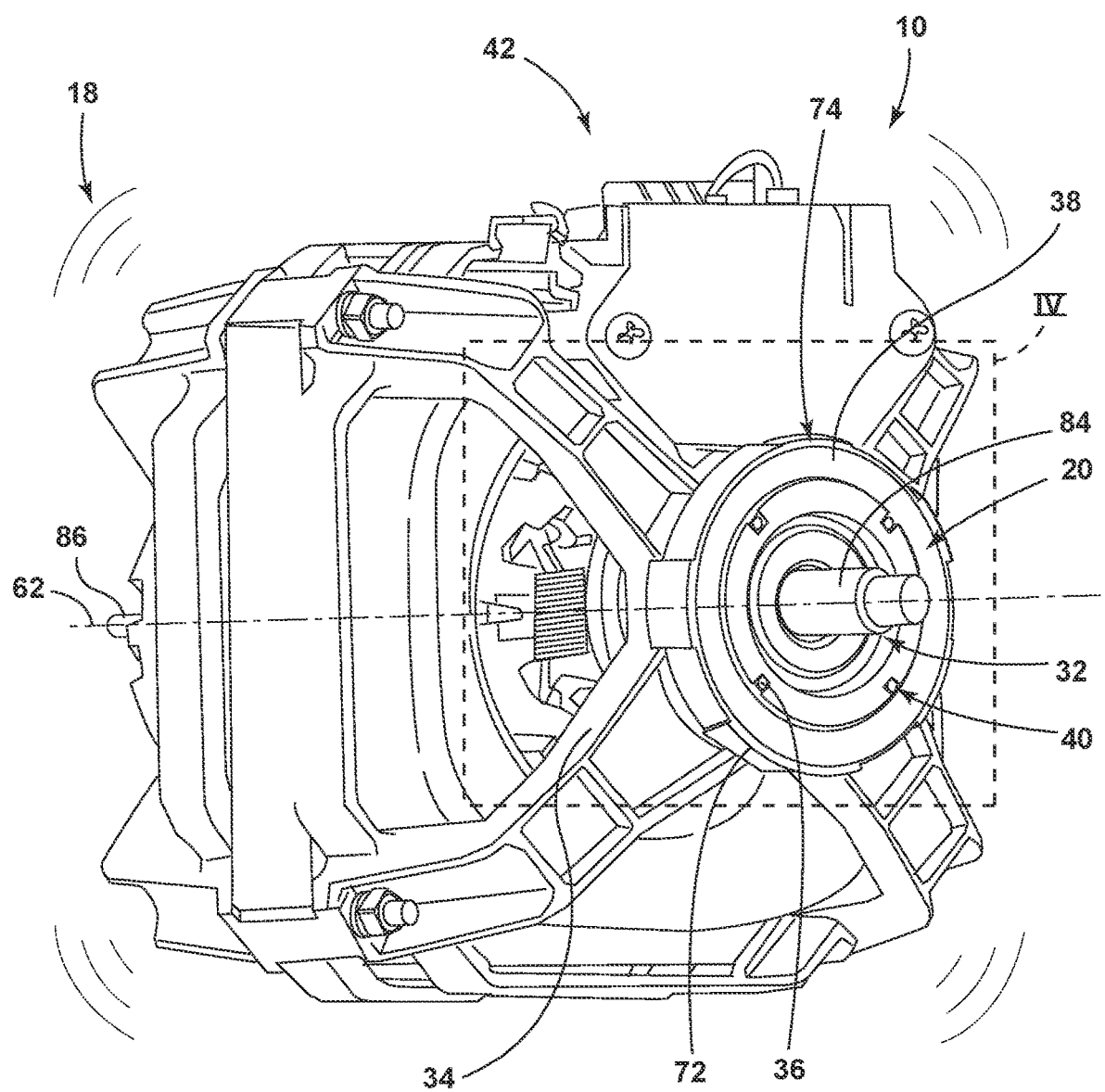
FIG. 3 is a side perspective view of an appliance motor incorporating an aspect of the damping ring for absorbing motor vibrations.
Figure 4:
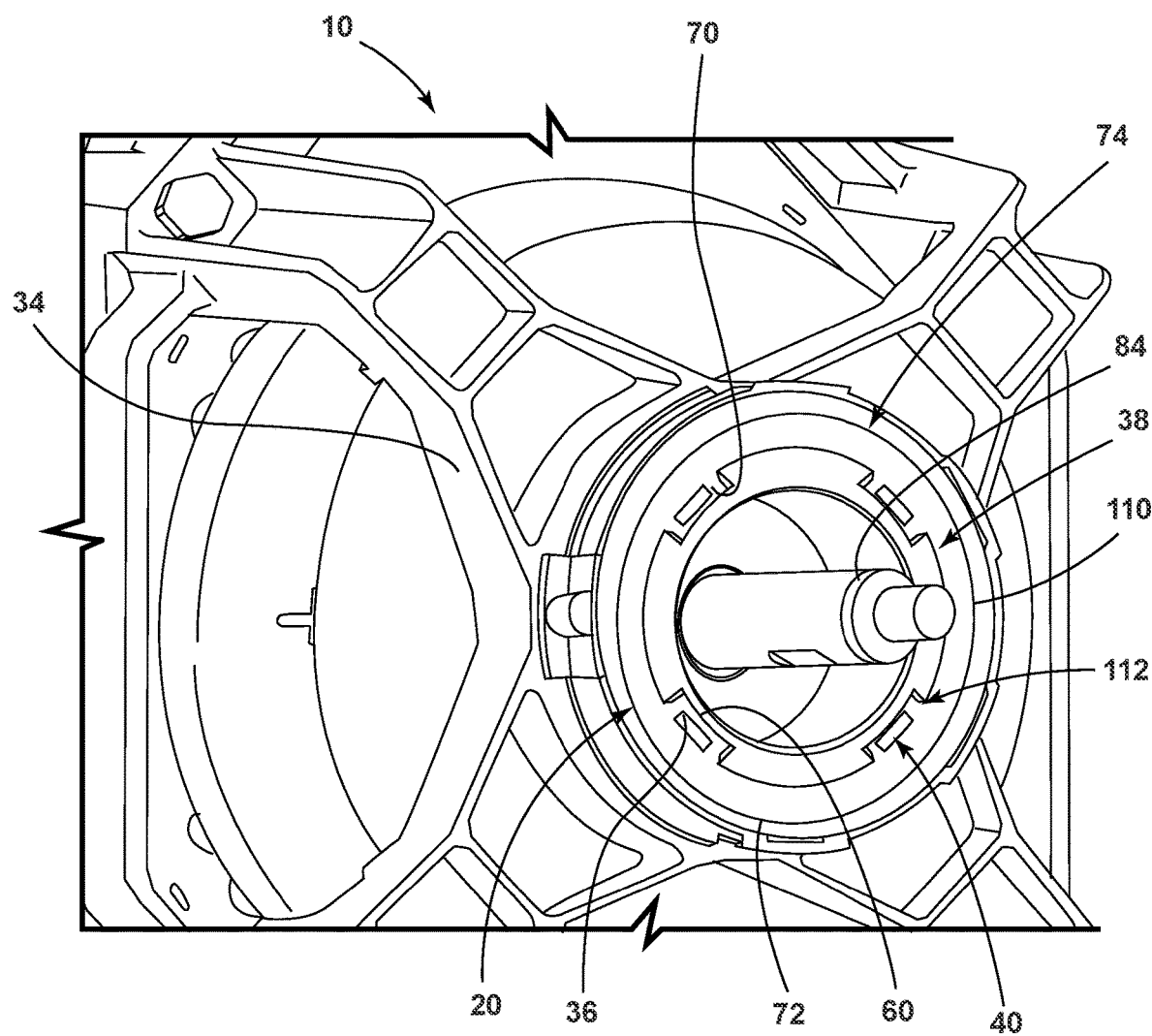
FIG. 4 is an enlarged perspective view of the laundry motor of FIG. 3, taken at area IV.
Figure 5:
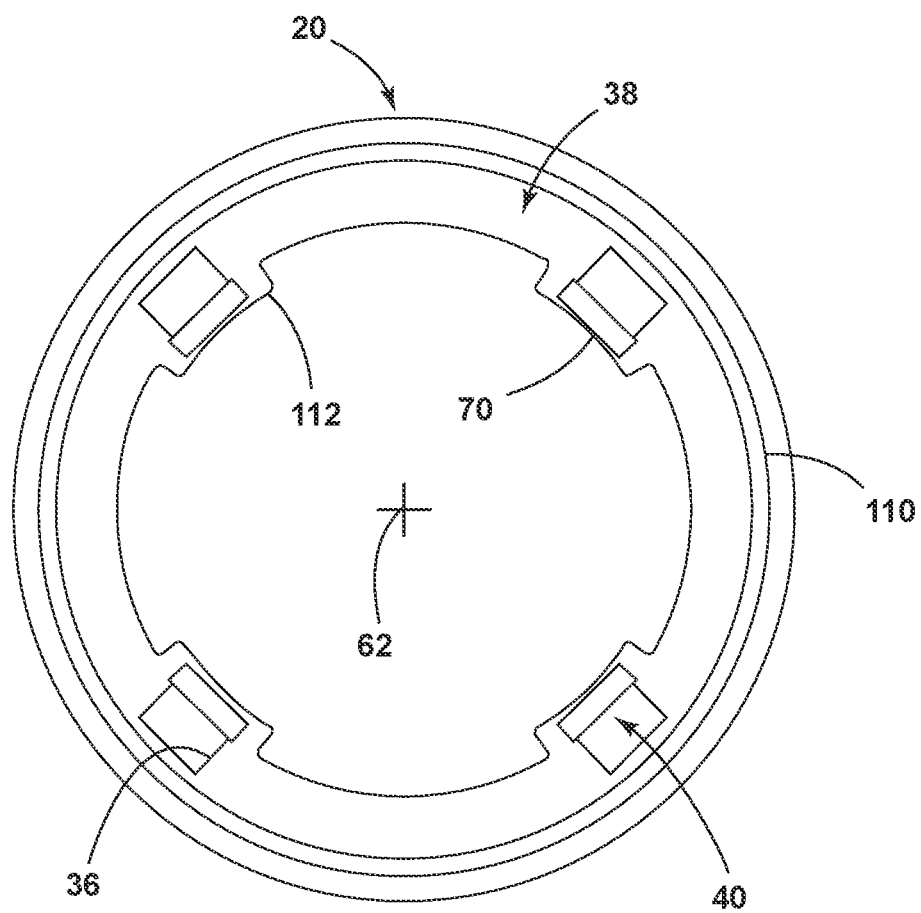
FIG. 5 is an elevational view of an aspect of the damping ring.
Figure 6:
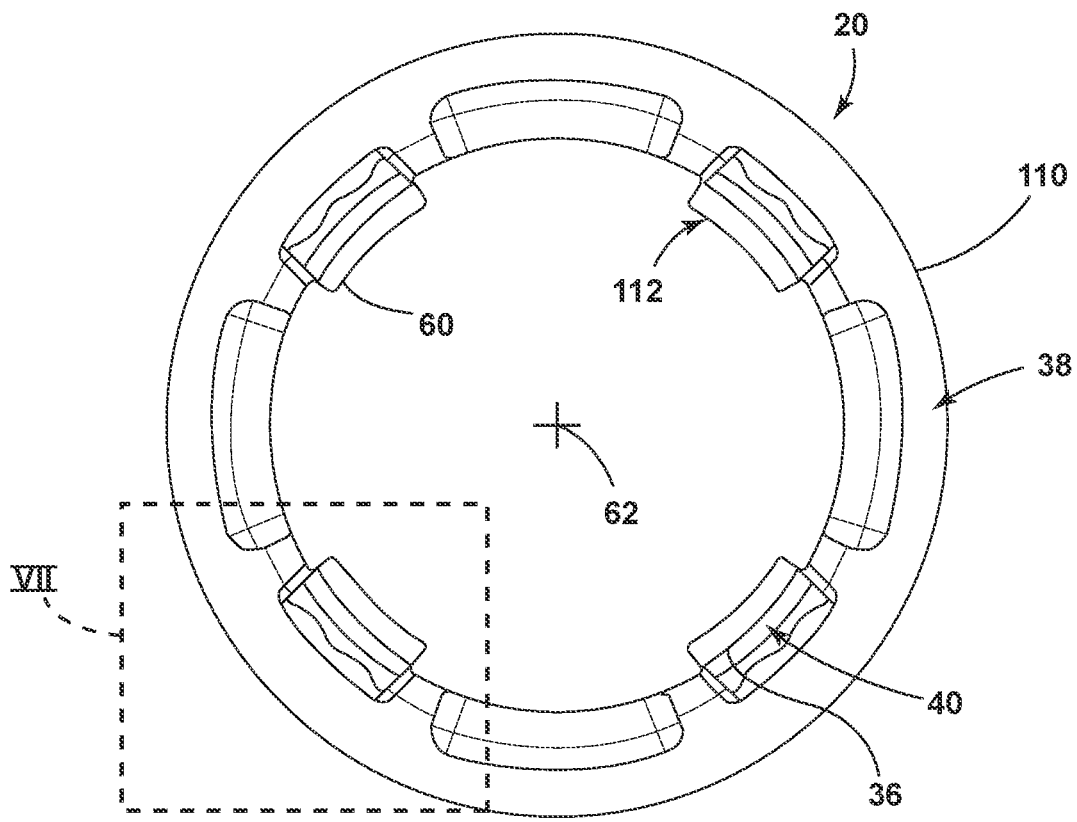
FIG. 6 is a side elevational view of an aspect of a damping ring.
Figure 7:
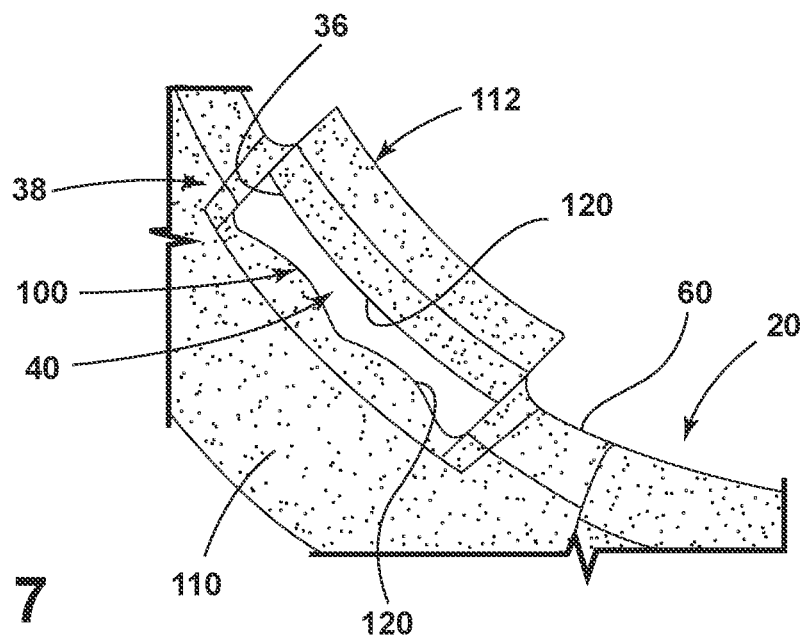
FIG. 7 is an enlarged elevational view of the damping ring of FIG. 6 taken at area VII.
Figure 8:
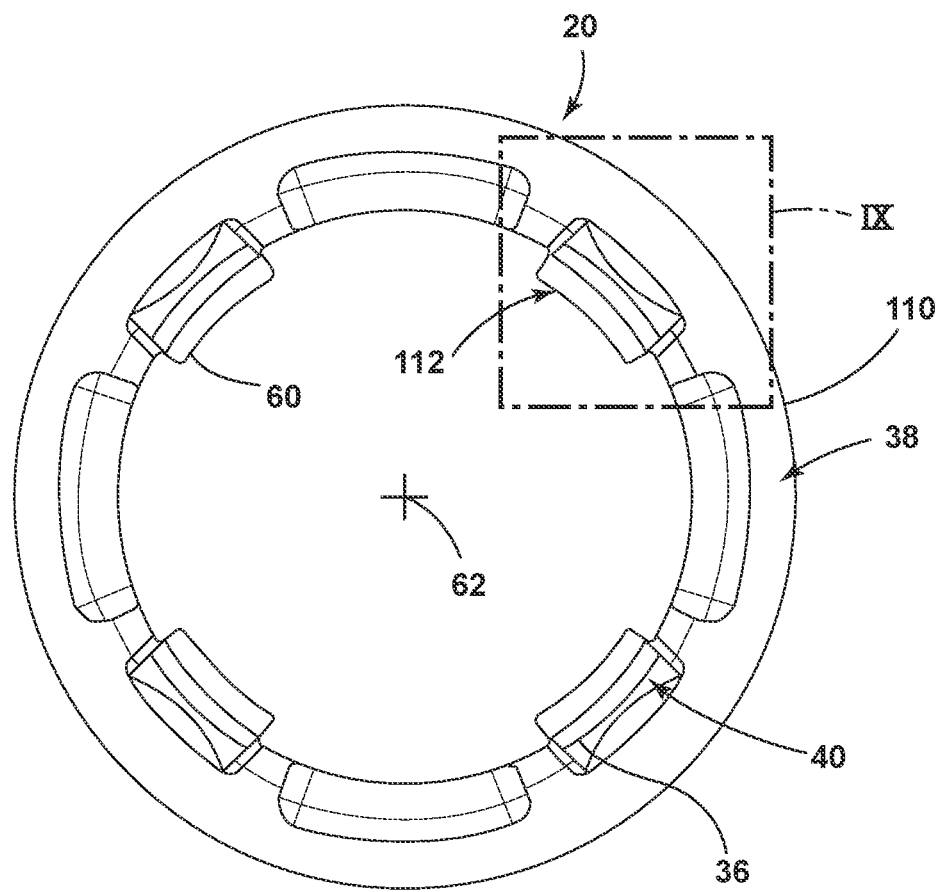
FIG. 8 is an elevational view of an aspect of the damping ring.
Figure 9:
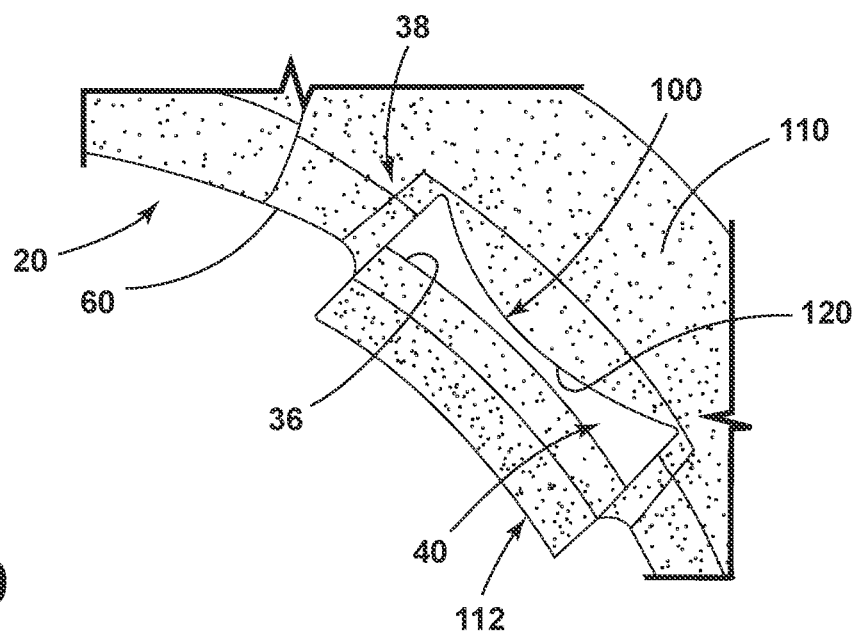
FIG. 9 is an enlarged elevational view of the damping ring of FIG. 8 taken at area IX.

The components in the figures are not necessarily to scale, emphasis instead being placed upon illustrating the principles described herein.

DETAILED DESCRIPTION

The present illustrated embodiments reside primarily in combinations of method steps and apparatus components related to a damping ring for an appliance motor having voids that absorb motor vibrations. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . ." does not, without more constraints, preclude the existence of additional identical elements in the process, method, article, or apparatus that comprises the element.

Referring to FIGS. 1-4, reference numeral 10 generally refers to a motor incorporated within an appliance 12, where the motor 10 is attached to an interior structure 14 of the appliance 12 and is activated for operating certain mechanisms within the appliance 12. In certain aspects, the motor 10 is incorporated within a laundry appliance 12 and is attached to a structure 14 of the laundry appliance 12 and surrounded by a cabinet 16 that conceals the inner workings of the appliance 12. During operation of the motor 10, the motor 10 produces certain vibrations 18 that can be transferred from the motor 10, through the structure 14 and to various components of the appliance 12. A damping ring 20 is included to absorb at least a portion of these vibrations 18 to limit the transmission of vibrations 18 through the appliance 12. According to various aspects of the device, the appliance 12 can include a cabinet 16. In certain aspects of the appliance 12, a tub 22 is positioned within the cabinet 16 and a rotating drum 24 is disposed within the tub 22. It is also contemplated in certain drying-type appliances 12 that a rotating drum 24 is positioned within the cabinet 16 without a tub 22. A blower 26 directs process air through an airflow path 28, where the airflow path 28 typically includes the drum 24. The motor 10 is coupled to one of the structure 14 and the tub 22 via a retaining bracket 30. The retaining bracket 30 can define at least a portion of the structure 14 for the appliance 12. The motor 10 includes a drive shaft 32 that is operably coupled to at least one of the drum 24 and the blower 26. In certain aspects, the drive shaft 32 of the motor 10 can be attached to both of the drum 24 and the blower 26, as well as other operating components of the appliance 12. The damping ring 20 is positioned about the drive shaft 32 and between a housing 34 for the motor 10 and the retaining bracket 30. Damping apertures 36 are defined within a body 38 of the damping ring 20. The damping apertures 36 define respective voids 40 that assist in absorbing operational vibrations 18 generated by the motor 10 in an activated state 42. Stated another way, the voids 40 of the damping ring 20 help to isolate the vibrations of the motor 10 from the retaining bracket 30. Accordingly, the motor 10 is able to vibrate in a manner that is at least partially independent of the retaining bracket 30 so that these vibrations 18 are not transferred to the retaining bracket 30.

During operation of the motor 10, a stator (not shown) is electrically energized to produce an electromotive force that drives a rotor (not shown) attached to the drive shaft 32. As the drive shaft 32 rotates, certain vibrations 18 are produced within the motor 10 that can be transferred through the housing 34 for the motor 10 and into the structure 14 for the appliance 12. The damping ring 20 operates to isolate at least a portion of these vibrations 18 emanating from the housing 34 for the motor 10. By absorbing or damping these vibrations 18, the intensity of vibrations 18 transferred into the structure 14 for the appliance 12 is decreased. This decrease in the frequency, amplitude or intensity of transferred vibrations 18 also results in a decrease in noise and undesirable vibrating produced by the components of the appliance 12. Damping these vibrations 18 using the damping ring 20 also minimizes the amount of shaking, oscillating, or other frequency-type movements that occur within the appliance 12 while the motor 10 is in an activated state 42.

Referring now to FIGS. 5-9, the one or more voids 40 of the damping ring 20 that are defined by the corresponding damping apertures 36 are positioned around an interior portion 60 of the body 38. These voids 40 are typically spaced around the body 38 of the damping ring 20 and evenly spaced around the drive shaft 32. Through this configuration, the voids 40 can be equally spaced to absorb vibrations 18 of the housing 34 for the motor 10 that may occur in a variety of directions with respect to a rotational axis 62 of the drive shaft 32 for the motor 10.

As exemplified in FIGS. 5-9, the damping ring 20 includes four damping apertures 36 that define four distinct voids 40. These voids 40 are surrounded by material of the damping ring 20, in the form of a void surface, such that the voids 40 and the damping apertures 36 define through holes that extend entirely through the body 38 of the damping ring 20. The inner protrusion 70 of the body 38 typically extends toward the rotational axis 62 of the drive shaft 32. This can serve as the retaining mechanism that helps to rotationally secure the damping ring 20 within a damping receptacle 72 defined within the housing 34 of the motor 10. The damping receptacle 72 typically includes a channel 74 that receives the damping ring 20 proximate the drive shaft 32. The damping ring 20 also can define a primary attachment point of the housing 34 for the motor 10 with the retaining bracket 30 of the appliance 12. It is contemplated that the primary contact points between the housing 34 for the motor 10 and the structure 14 of the appliance 12 is via the retaining bracket 30. Through this configuration, substantially all of the vibrations 18 that emanate from the housing 34 for the motor 10 can be directed through the damping ring 20 to be at least partially absorbed by the damping apertures 36 and the voids 40 defined therein. It should be understood that various configurations and numbers of damping apertures 36 and voids 40 can be incorporated into the damping ring 20.

It is contemplated that certain amounts of vibrations 18 may travel through the drive shaft 32 to be transferred through other operational components of the appliance 12. The drive shaft 32 can be coupled directly to certain aspects of the device, in the form of a direct drive motor 10. It is also contemplated that certain components of the appliance 12 can be a belt-drive motor. In such an aspect of the device, the drive shaft 32 can be attached to the operable components of the appliance 12 via a drive belt 82 that extends around the drive shaft 32 and an operating rotor 80 for the component of the appliance 12.

Typically, the motor 10 for the appliance 12 will be attached to an operating rotor 80 for the rotating drum 24, where a drive belt 82 extends between the drive shaft 32 and the operating rotor 80. In certain aspects, it is also contemplated that the motor 10 can include opposing first and second sections 84, 86 of the drive shaft 32 that extend from opposing sides of the housing 34. In such a configuration, the motor 10, via the drive shaft 32, can engage separate operating mechanisms positioned within the cabinet 16. Damping rings 20 can be positioned around each of the first and second sections 84, 86 of the drive shaft 32. Accordingly, each side of the housing 34 for the motor 10 includes respective damping rings 20 extending between the motor 10 and the retaining bracket 30.

In conditions where the motor 10 includes a single drive shaft 32, it is contemplated that the housing 34 for the motor 10 can include opposing damping rings 20 that help to secure the motor 10 to the retaining bracket 30. Where a single drive shaft 32 is included, the damping ring 20 positioned opposite the drive shaft 32 can be positioned within a damping receptacle 72 of the housing 34 and attached to the retaining bracket 30 without also encircling a portion of the drive shaft 32.

In each condition, it is contemplated that the damping rings 20 are positioned between the housing 34 for the motor 10 and the primary connecting interface at the retaining bracket 30 to absorb vibrations 18 emanating from the motor 10. The retaining bracket 30 extends from the housing 34 for the motor 10 and is separated from the housing 34 via the damping rings 20. The retaining bracket 30 extends to the structure 14 of the appliance 12 and the structure 14 of the appliance 12 is, in turn, attached to the cabinet 16 for the appliance 12. Accordingly, use of the damping rings 20 can serve to limit the transfer of vibrations 18 from the housing 34 for the motor 10 to multiple components within the appliance 12, including the cabinet 16, the structure 14 and various operating components for the appliance 12.

According to various aspects of the device, the damping ring 20 can be in the form of an elastomeric member having certain elastic properties that can be used to absorb vibrations 18. This elastomeric member also defines the through holes for the damping apertures 36 that in turn defines the voids 40 for the damping ring 20.

In certain aspects of the device, as exemplified in FIGS. 6-9, the damping apertures 36 of the body 38 for the damping ring 20 can include opposing contoured portions 100 that selectively engage one another to further absorb operational vibrations 18 generated by the motor 10 in the activated state 42. These opposing contoured portions 100 can serve to absorb certain amounts of vibrations 18 while separated. Under more extreme or intense vibrations 18 of the motor 10 that may be experienced during particular rotational frequencies of the motor 10, the opposing contoured portions 100 of the damping apertures 36 may engage one another. In these engaged configurations during intense vibrations 18, contact of the opposing contoured portions 100 may further dampen vibrations 18 emanating from the housing 34 for the motor 10 in the activated state 42.

Referring again to FIGS. 6-9, the opposing contoured portions 100 can be in the form of a general arcuate shape, undulating formations, outwardly-extending arcs, and other similar configurations that can be used to enhance the dampening characteristics of the damping ring 20 and the damping apertures 36.

As exemplified in FIGS. 10-13, it has been found that certain operational frequencies of the motor 10 tend to produce more intense vibrations 18 than others. Accordingly, the damping ring 20 that is attached to the housing 34 for the motor 10 is configured to accommodate all frequencies, including these particular frequencies that produce more intense vibrations 18 or more accentuated amplitudes or frequencies of vibrations 18 during operation of the motor 10 in the activated state 42. Accordingly, the configurations of the damping ring 20 disclosed herein have shown positive results in the form of decreased noise and vibration 18 across a wide range of operational frequencies and speeds.

The voids 40 that are defined by the damping apertures 36 are generally empty such that only air or gas is contained therein. In certain aspects of the device, these voids 40 may be filled with certain lubricants or other materials that may serve to modulate the dampening characteristics of the damping ring 20. Typically, only air is included within the voids 40 and they are maintained in an empty state with respect to the housing 34 of the motor 10 and the retaining bracket 30.

Referring again to FIGS. 1-9, the appliance 12 includes the structure 14. The motor 10 is coupled to the structure 14 for the appliance 12 via the retaining bracket 30. The motor 10 includes the drive shaft 32 that is operably coupled to at least one rotational operating mechanism. The elastomeric damping ring 20 is positioned about the drive shaft 32 between the motor 10 and the retaining bracket 30. The damping apertures 36 are defined within the body 38 of the elastomeric damping ring 20 that form voids 40 that extend through the interior portion 60 of the body 38. The voids 40 absorb operational vibrations 18 generated by the motor 10 in an activated state 42.

According to various aspects of the device, the structure 14 for the appliance 12 can include at least one of a cabinet 16 and a tub 22, where the motor 10 is attached to an interior structure 14, the cabinet 16, the tub 22, or other similar supporting feature of the appliance 12. In this manner, the retaining bracket 30 can extend from the motor 10 to any one of these structural fastening components of the appliance 12. As discussed above, the motor 10 can be attached to various operating components within the appliance 12. These operating components can include, but are not limited to, the rotating drum 24, the blower 26, a fluid pump, an auxiliary blower, condensate pumps, combinations thereof and other similar operating components that are typically operated in relation to a corresponding rotational axis 62. The engagement between the motor 10 and these operating components can be through a direct-drive engagement or through a belt-drive engagement. Each void 40 of the damping ring 20 can be defined between the outer ring 110 of the body 38 and the inner protrusion 70 of the body 38. The inner protrusion 70 typically extends inward from a portion of the body 38. In this manner, the various inner protrusions 70 can serve as locking mechanisms 112 to prevent rotation of the damping ring 20 within the channel 74 of the damping receptacle 72. The securing channel 74 can be defined within the housing 34 for the motor 10. It is also contemplated, in certain aspects, that the securing channel 74 can be disposed within the retaining bracket 30 for the appliance 12.

Referring again to FIGS. 6-9, each damping aperture 36 can include at least one contoured portion 100 that is configured to selectively engage an opposing section 120 of the damping aperture 36. This selective engagement of the contoured portion 100 with the opposing section 120 can operate to further absorb operational vibrations 18 generated by the motor 10 in the activated state 42.

Referring again to FIGS. 1-9, the laundry appliance 12 can include the cabinet 16 and the tub 22 positioned within the cabinet 16. The rotating drum 24 can be positioned within the tub 22 or can be within the cabinet 16 without the tub 22. The blower 26 directs process air through the airflow path 28 and typically through the drum 24. The motor 10 is coupled to one of the cabinet 16, the interior structure 14 and the tub 22 via the retaining bracket 30. The motor 10 includes a drive shaft 32 extending through opposing sides of the motor 10 and operably coupled to operating components of the appliance 12, typically the drum 24 and the blower 26. Damping rings 20 are positioned about the drive shaft 32 and at the opposing sides of the motor 10. The damping rings 20 are positioned between the motor 10 and the retaining bracket 30. The damping voids 40 extend through a body 38 of the damping ring 20, wherein the damping voids 40 absorb operational vibrations 18 generated by the motor 10 in the activated state 42. As discussed above, the damping rings 20 are typically contained within channels 74 defined within the housing 34 for the motor 10.

Referring now to FIGS. 10-13, various studies have shown that the damping ring 20, including the damping apertures 36 and voids 40 provides a significant improvement in the amount of vibrations 18 that are transferred from the motor 10 and to the various components of the appliance 12. These vibrations 18 can occur in a wide range of directions and orientations that may be parallel with, perpendicular to, or oblique to the rotational axis 62 of the motor 10. The schematic diagram of FIG. 10 exemplifies a baseline frequency within various components of the appliance 12. As can be seen through this diagram, operation of the motor 10 produces varying ranges of frequencies depending upon the operating speed of the motor 10.

Figure 10:
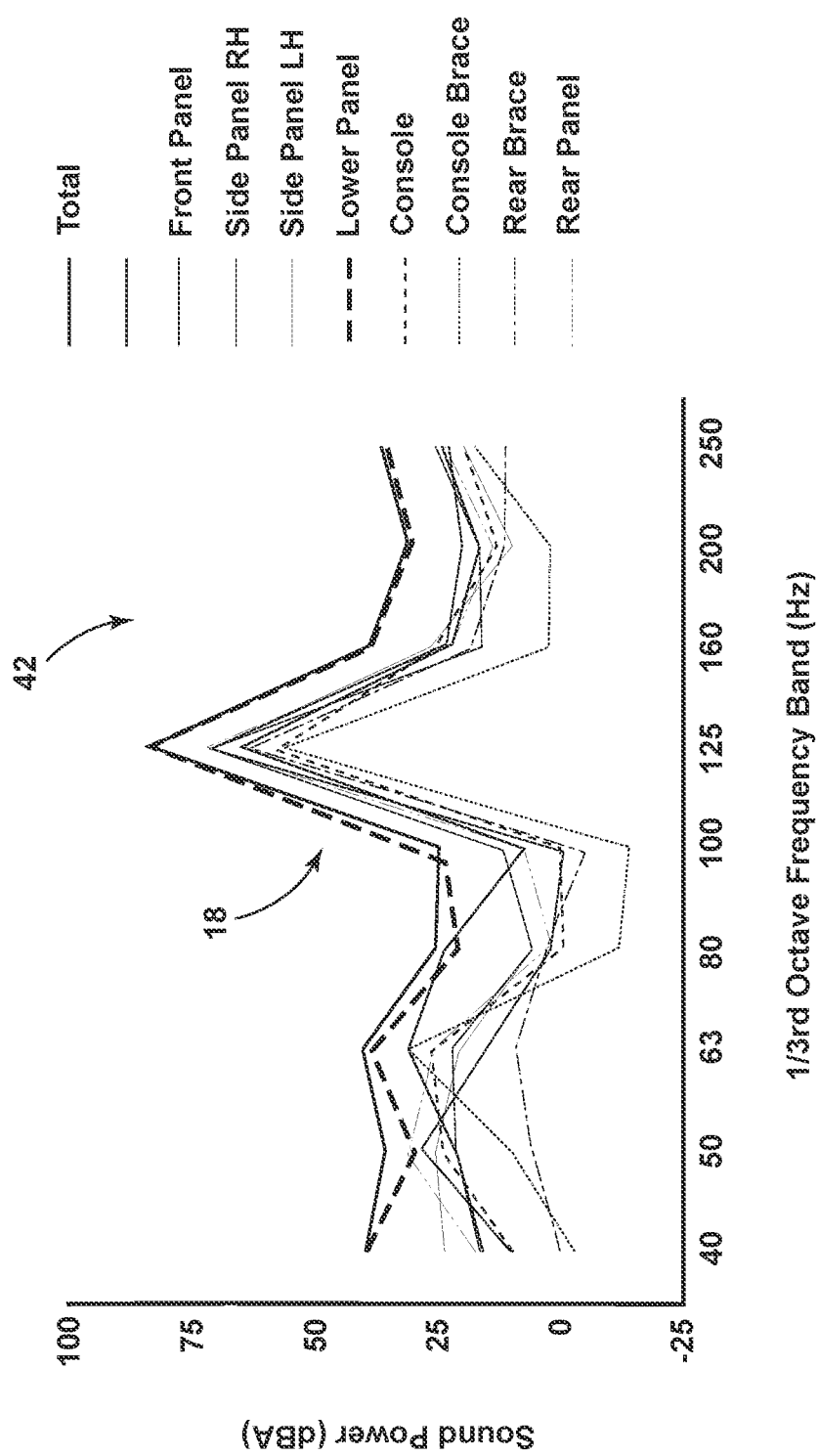
FIG. 10 is an exemplary schematic diagram illustrating various baseline vibrational frequencies and sound levels of components within an appliance, without the use of the vibration damping ring.
Figure 11:
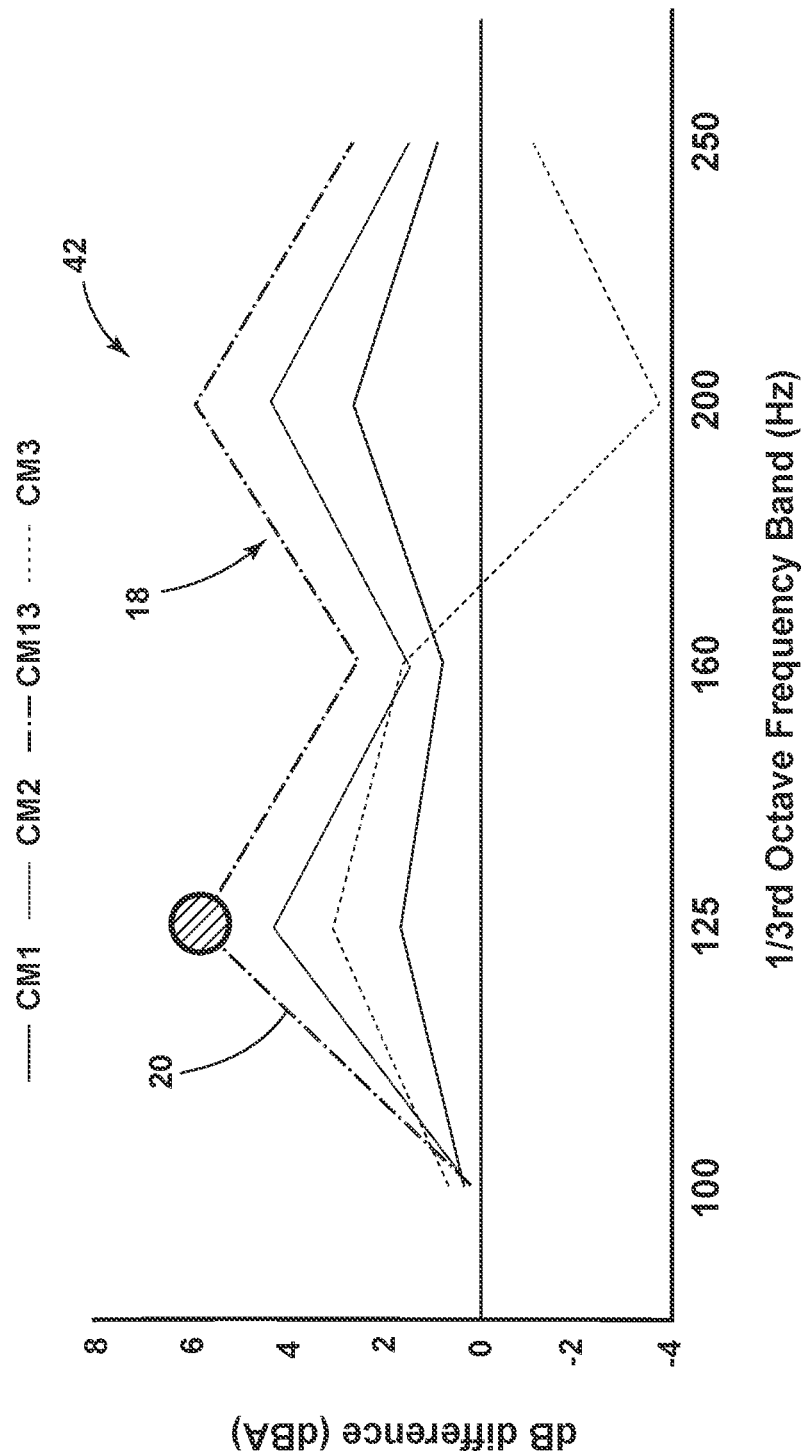
FIG. 11 is a schematic diagram illustrating vibration damping performance of certain damping ring configurations, where aspects of CM3 are exemplified in FIGS. 3-9.

As exemplified in FIG. 11, certain aspects of the device, as generally exemplified in FIGS. 5-9, absorb a significant amount of vibration 18 and decrease the amount of noise produced by the appliance 12 as a result of the vibrations 18 transferred by the motor 10. The Y-axis of the diagram of FIG. 10 shows a difference in decibels, where zero shows no perceptible change, slope in the positive direction of the Y-axis shows the amount of decrease in decibels, and slope of the graph downward in the Y-axis shows an increase in noise. Accordingly, the device generally set forth in FIGS. 5-9, through this exemplary trial run, have shown an improvement of approximately 6 decibels. Other configuration of appliances 12 may show different changes in decibel output of the appliance 12.

Figure 12:
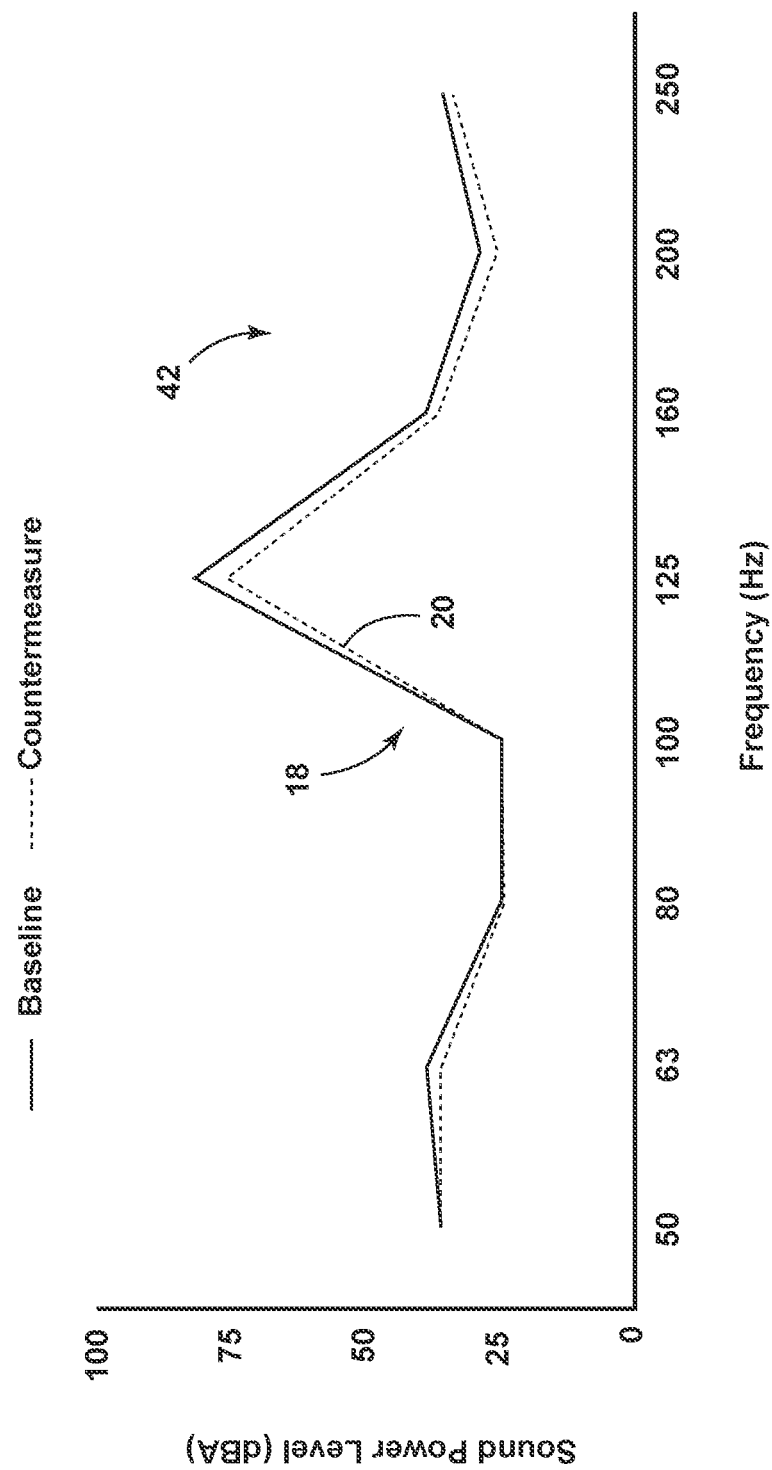
FIG. 12 is an exemplary schematic diagram illustrating performance improvement utilizing an aspect of the damping ring and exemplifying sound power level in relation to frequency.
Figure 13:
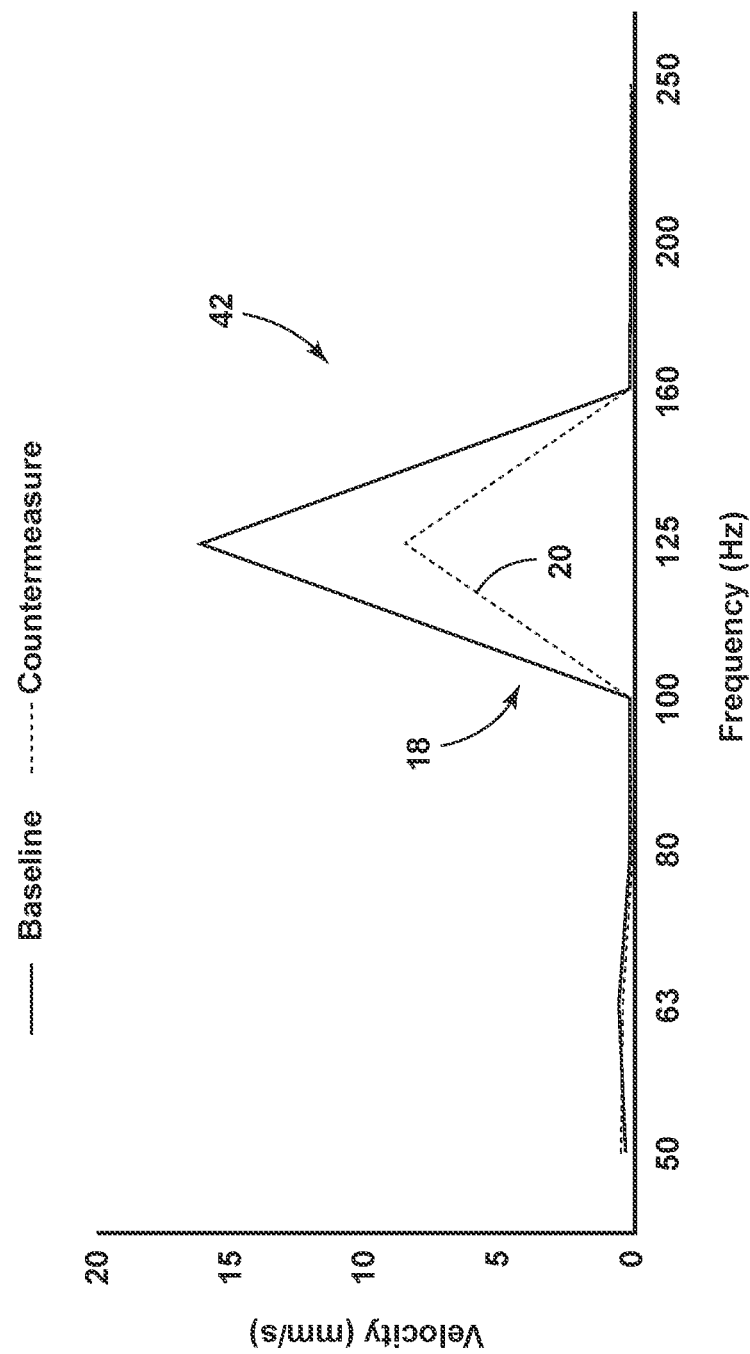
FIG. 13 is a schematic diagram illustrating vibration velocity in relation to frequency using an aspect of the damping ring as opposed to no damping features.

As exemplified in FIGS. 12 and 13, the exemplary and schematic diagrams illustrate a decrease in noise (decibels) as well as a decrease in the velocity of vibrations 18 (FIGS. 12 and 13, respectively) as a result of the countermeasure. These countermeasures, as described herein, are in the form of the damping ring 20 having the through holes that form the voids 40.

The studies exemplified in FIGS. 11-13 have also investigated damping rings 20 having openings that are partially defined within the body 38 of the damping ring 20 and do not extend entirely through the body 38 of the damping ring 20. Studies have shown that through holes that form the voids 40 provide a better damping performance. It should be understood that voids 40 having different sizes and different numbers of voids 40 can produce varying improvements in the noise level and the vibration level produced by the appliance 12 during operation of the motor 10 in the activated state 42.

According to various aspects of the device, the damping ring 20 having the damping apertures 36 and the voids 40 can be used within motors 10 for various appliances 12. Such motors 10 can include, but are not limited to, compressor motors within appliances, dishwasher motors, washing appliances, drying appliances, combination washing and drying appliances, fans within cooking appliances, motors for operating fluid pumps within certain appliances, combinations thereof and other similar appliance settings that require use of a motor for performing various activities relative to the appliance 12.

According to the various aspects of the device, as exemplified in FIGS. 3-9, the voids 40 defined within the damping ring 20 have shown to reduce dynamic stiffness. This, in turn, diminishes the forces and vibrations 18 that are translated through the motor 10 and into the structure 14 for the appliance 12. The voids 40 can also act as bump stops to stiffen the various geometries of the elastomeric material of the damping ring 20. The various aspects of the damping ring 20, as exemplified herein, provide isolation during steady state operation of the motor 10, while maintaining good control due to potential larger forces and vibrations 18 coming from certain other conditions within the appliance 12. Such conditions can include, but are not limited to, drum unbalance, fan unbalance, starting up forces, motor-stopping forces, and other similar motor-operating configurations that produce higher degree or higher intensity vibrations 18 within the appliance 12.

Use of the damping ring 20 has shown to reduce sound levels emanating from the appliance 12, as well as vibrations 18 emanating from the appliance 12. Due to the vibration isolating capabilities of the damping apertures 36 and the voids 40, noise and vibration 18 can be diminished during operation of the appliance 12.

According to another aspect of the present disclosure, a laundry appliance includes a cabinet. A rotating drum is positioned within the cabinet. A blower directs process air through an airflow path. The airflow path includes the drum. A motor is coupled to the cabinet via a retaining bracket. The motor includes a drive shaft operably coupled to one of the drum and the blower. A damping ring is positioned about the drive shaft and between the motor and the retaining bracket. Damping apertures are defined within a body of the damping ring. The damping apertures define respective voids that absorb operational vibrations generated by the motor in an activated state.

According to another aspect, the voids are positioned around an interior portion of the body.

According to yet another aspect, the voids are spaced around the drive shaft.

According to another aspect of the present disclosure, each void is defined between an outer ring of the body and an inner protrusion of the body.

According to another aspect, the damping apertures include opposing contoured portions that selectively engage one another to further absorb operational vibrations generated by the motor in the activated state.

According to yet another aspect, the drive shaft extends from opposing sides of the motor to engage separate operating mechanisms positioned within the cabinet, and wherein each side of the motor includes respective damping apertures extending between the motor and the retaining bracket.

According to another aspect of the present disclosure, the retaining bracket is coupled to the cabinet.

According to another aspect, the motor is a belt-drive motor and a drive belt extends around the drive shaft.

According to yet another aspect, the damping ring includes four distinct voids positioned evenly about the drive shaft.

According to another aspect of the present disclosure, the damping ring is an elastomeric member.

According to another aspect, a laundry appliance includes an interior structure. A motor is coupled to the appliance structure via a retaining bracket. The motor includes a drive shaft operably coupled to at least one rotational operating mechanism. An elastomeric damping ring is positioned about the drive shaft and between the motor and the retaining bracket. Damping apertures are defined within a body of the elastomeric damping ring that form voids that extend through an interior of the body. The voids absorb operational vibrations generated by the motor in an activated state.

According to yet another aspect, the appliance structure includes at least one of a cabinet and a tub.

According to another aspect of the present disclosure, the rotational operating mechanism includes at least one of a rotating drum, a blower and a fluid pump.

According to another aspect, each void is defined between an outer ring of the body and an inner protrusion of the body.

According to yet another aspect, each damping aperture includes at least one contoured portion that is configured to selectively engage an opposing section of the damping aperture to further absorb operational vibrations generated by the motor in the activated state.

According to another aspect of the present disclosure, the drive shaft extends from opposing sides of the motor to engage separate operating mechanisms positioned within a cabinet. Each side of the motor includes respective damping mechanisms extending between the motor and the retaining bracket.

According to another aspect, the elastomeric damping ring includes four distinct voids positioned evenly about the drive shaft.

According to yet another aspect, a laundry appliance includes a cabinet. A rotating drum is positioned within the cabinet. A blower directs process air through an airflow path. The airflow path includes the drum. A motor is coupled to the cabinet via a retaining bracket. The motor includes a drive shaft extending through opposing sides of the motor and operably coupled to the drum and the blower. Damping rings are positioned about the drive shaft and at the opposing sides of the motor. The damping rings are positioned between the motor and the retaining bracket. Damping voids extend through a body of the damping ring. The damping voids absorb operational vibrations generated by the motor in an activated state.

According to another aspect of the present disclosure, each of the damping voids is surrounded by an aperture having a void surface that defines the corresponding damping void.

According to another aspect, the damping voids are defined by opposing contoured portions that selectively engage one another to further absorb operational vibrations generated by the motor in the activated state.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body 38 with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:
   a cabinet;
   a rotating drum positioned within the cabinet;
   a blower that directs process air through an airflow path, the airflow path including the drum;
   a motor coupled to the cabinet via a retaining bracket, the motor including a drive shaft operably coupled to one of the drum and the blower;
   a damping ring positioned about the drive shaft and between the motor and the retaining bracket, wherein damping apertures are defined within a body of the damping ring, the damping apertures defining respective voids that absorb operational vibrations generated by the motor in an activated state; and
   opposing contoured portions of each damping aperture, wherein the opposing contoured portions are operable between a separated state and an engaged state, wherein the separated state is characterized by the opposing contoured portions being separated from one another to absorb low-amplitude operational vibrations generated by the motor in the activated state, and wherein the engaged state is characterized by the opposing contoured portions engaging one another during high-amplitude vibrations generated at least by an unbalanced condition of the drum.

2. The laundry appliance of claim 1, wherein the voids are positioned around an interior portion of the body.

3. The laundry appliance of claim 1, wherein the voids are spaced around the drive shaft.

4. The laundry appliance of claim 1, wherein each void is defined between an outer ring of the body and an inner protrusion of the body.

5. The laundry appliance of claim 1, wherein the drive shaft extends from opposing sides of the motor to engage separate operating mechanisms positioned within the cabinet, and wherein each side of the motor includes respective damping apertures extending between the motor and the retaining bracket.

6. The laundry appliance of claim 1, wherein the retaining bracket is coupled to the cabinet.

7. The laundry appliance of claim 1, wherein the motor is a belt-drive motor and a drive belt extends around the drive shaft.

8. The laundry appliance of claim 1, wherein the damping ring includes four distinct voids positioned evenly about the drive shaft.

9. The laundry appliance of claim 1, wherein the damping ring is an elastomeric member.

10. A laundry appliance comprising:
    an interior structure;

a motor coupled to the interior structure via a retaining bracket, the motor including a drive shaft operably coupled to at least one rotational operating mechanism;

an elastomeric damping ring positioned about the drive shaft and between the motor and the retaining bracket, wherein damping apertures are defined within a body of the elastomeric damping ring that form voids that extend through an interior of the body, wherein, each viod includes at least one contoured portion that selectively engages an opposing section of the void;

the at least one contoured portion and the opposing section being operable between a separated state and an engaged state;

the separated state configured to absorb low-intensity operational vibrations produced by the motor; and in response to high-intensity vibrations the at least one contoured portion and the opposing section selectively engage one another to define the engaged state that forms an enhanced damping structure.

11. The laundry appliance of claim 10, wherein the interior structure includes at least one of a cabinet and a tub.

12. The laundry appliance of claim 10, wherein the at least one rotational operating mechanism includes at least one of a rotating drum, a blower and a fluid pump.

13. The laundry appliance of claim 10, wherein each void is defined between an outer ring of the body and an inner protrusion of the body.

14. The laundry appliance of claim 10, wherein the drive shaft extends from opposing sides of the motor to engage separate rotational operating mechanisms positioned within a cabinet, and wherein each side of the motor includes respective damping mechanisms extending between the motor and the retaining bracket.

15. The laundry appliance of claim 10, wherein the elastomeric damping ring includes four distinct voids positioned evenly about the drive shaft.

16. A laundry appliance comprising:

a cabinet;

a rotating drum positioned within the cabinet;

a blower that directs process air through an airflow path, the airflow path including the drum;

a motor coupled to the cabinet via a retaining bracket, the motor including a drive shaft extending through opposing sides of the motor and operably coupled to the drum and the blower;

damping rings positioned about the drive shaft and at the opposing sides of the motor, wherein the damping rings are positioned between the motor and the retaining bracket, wherein damping voids extend through a body of the damping rings; and opposing contoured portions of the damping voids that define a separated state apart from one another that absorbs low-amplitude operational vibrations generated by the motor in an activated state, and wherein the opposing contoured portions of the damping voids selectively engage one another to define an engaged state in response to high-amplitude vibrations generated at least by an unbalanced condition of the rotating drum, wherein the engaged state operates to absorb the high-amplitude vibrations.

17. The laundry appliance of claim 16, wherein each of the damping voids is surrounded by an aperture having a void surface that defines the corresponding damping void.

* * * * *